Sept. 10, 1957 W. A. ADAMSKY 2,805,519
HANDLING GLASS SHEETS FOR THERMAL TREATMENT
Filed June 29, 1953 2 Sheets-Sheet 1
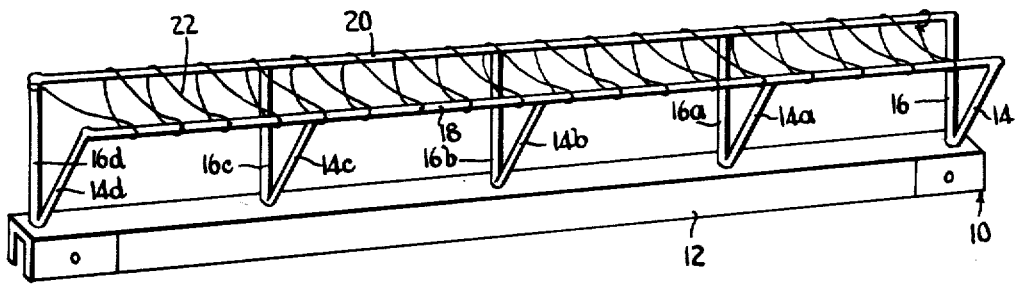
FIG. 1
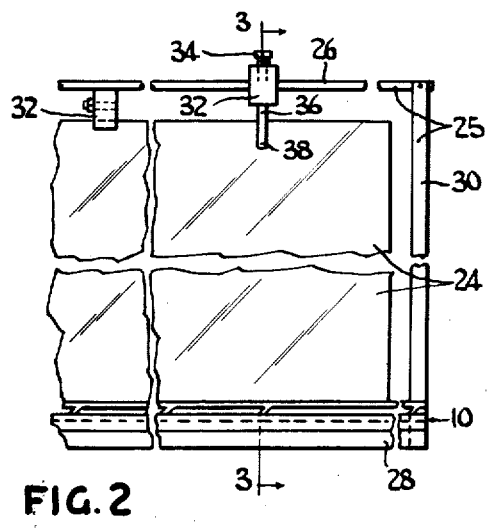
FIG. 2
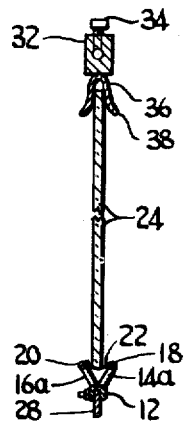
FIG. 3
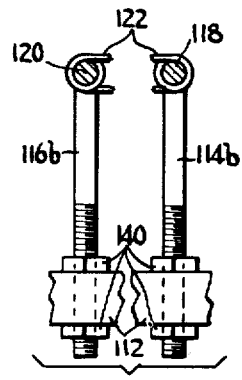
FIG. 5
FIG. 4
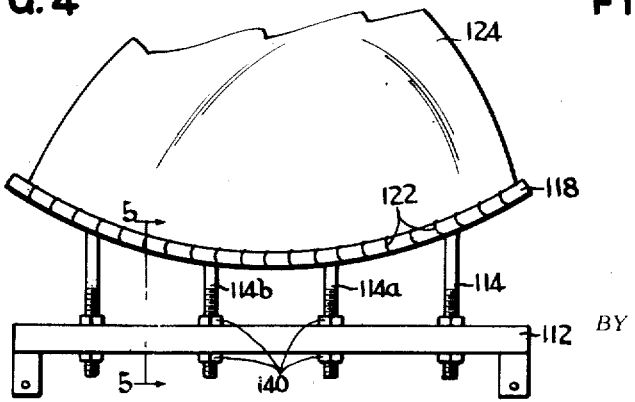
FIG. 6
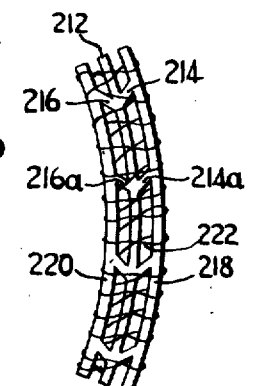
INVENTOR.
WALTER A. ADAMSKY
BY Oscar L. Spencer
ATTORNEY Sept. 10, 1957  W. A. ADAMSKY  2,805,519
HANDLING GLASS SHEETS FOR THERMAL TREATMENT
Filed June 29, 1953  2 Sheets-Sheet 2
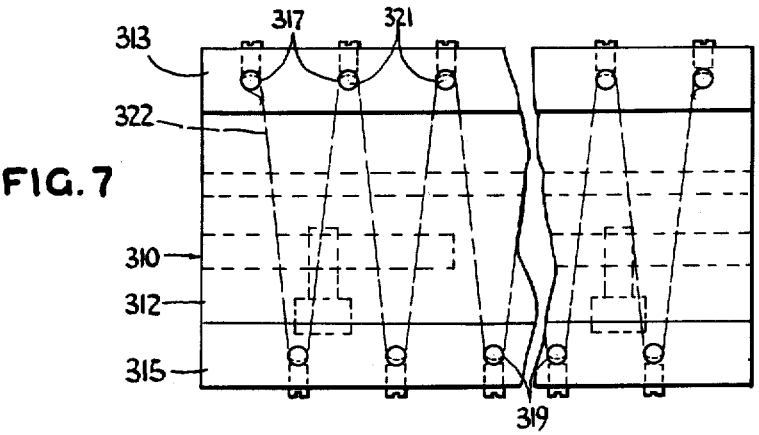
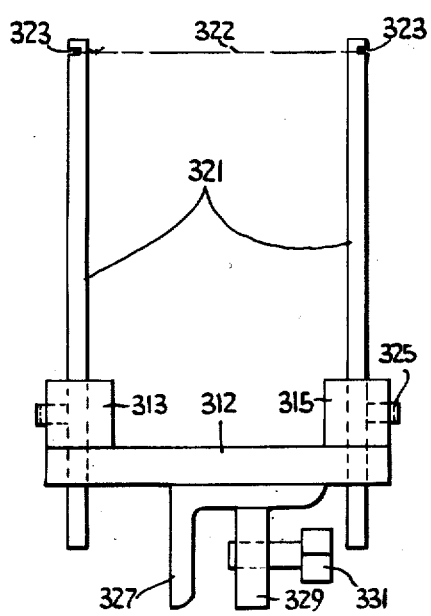
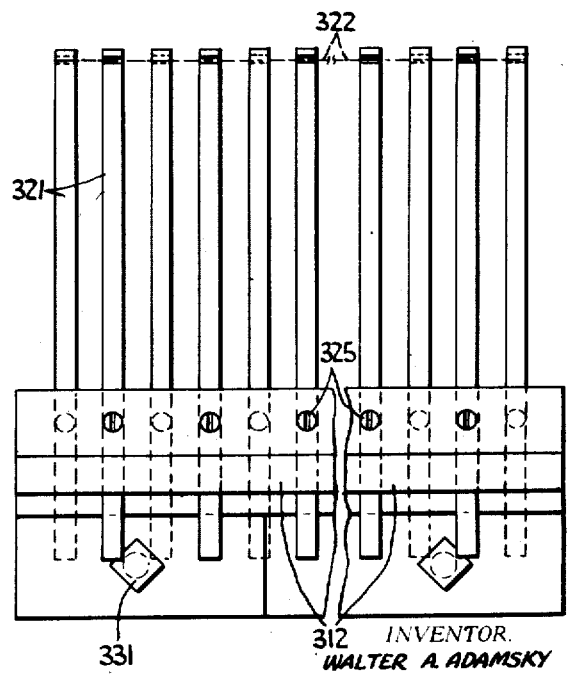
INVENTOR.
WALTER A. ADAMSKY
BY
Oscar L. Spencer
ATTORNEY

United States Patent Office 2,805,519
Patented Sept. 10, 1957

2,805,519

HANDLING GLASS SHEETS FOR THERMAL TREATMENT

Walter A. Adamsky, New Kensington, Pa., assignor to Pittsburgh Plate Glass Company, Allegheny County, Pa., a corporation of Pennsylvania Application June 29, 1953, Serial No. 364,565

7 Claims. (Cl. 49—45)

This invention relates to a novel method of supporting glass sheets vertically for thermal treatment by the use of novel supporting frames for glass sheets and it has particular relation to travelling frames for holding plane or curved glass sheets in an upright position during the tempering, annealing or spray coating thereof.

One object of the invention is to provide an improved arrangement of supporting elements adapted to hold a glass sheet in an upright position upon its lower edge and simultaneously provide uniform exposure of the surfaces of the sheet.

Another object of the present invention is to improve the optical quality of tempered glass by the provision of a novel supporting element which supports the glass at a plurality of spaced points along its bottom edge thereby eliminating distortion resulting from the use of tongs or other supports from which the glass is conventionally suspended.

Another object of the present invention is to provide a structure for use in tempering, annealing or spray coating glass that results in reduced cost of the operation.

Still another object of the present invention is to provide a structure for use in tempering, annealing or spray coating glass which enables a more uniform temper, anneal or coating to be produced.

While one embodiment of the invention will be described in detail in connection with tempering operations, it is understood that the invention is equally suitable for any operation where the entire glass sheet is to be uniformly exposed while the sheet is maintained in a vertical position. For example, the present invention is especially adapted for use in the spray application of transparent, electroconductive films on glass surfaces as well as many other obvious operations.

It has been customary in the past to suspend glass sheets during the tempering operation by means of tongs, which grip the upper edge portions of the glass. The conventional tempering process is characterized by heating the glass uniformly and then suddenly chilling the surfaces of the glass. Glass supported in this manner is marked by unsightly dents impressed by the tongs.

In a practical application of this invention, the glass is so supported that the use of tongs or other gripping members is obviated by supporting the lower edge of the glass on wires which are looped between a pair of sets of spaced supporting points. The lower edge of the glass is supported in such a manner that its weight is evenly distributed at spaced intervals on the plurality of wire loops. The glass is balanced in its vertical position by means of toggles or hairpin members which provide point balancing support near its upper vertical edge.

Certain typical embodiments of the present invention will be described below with reference to the accompanying drawing.

In the drawing:

Figure 1 is an isometric view of a supporting structure useful for supporting a flat sheet of glass in a vertical position;

Figure 2 is a partial side elevation view of the structure of Figure 1 shown in use with a typical tempering frame apparatus;

Figure 3 is a cross sectional view taken along the lines 3—3 of Figure 2;

Figure 4 is a side elevational view of a glass sheet supporting member suitable for supporting a glass sheet having curved edges;

Figure 5 is a view along the lines 5—5 of Figure 4;

Figure 6 is a top plan view of a supporting structure adapted to support curved sheets of glass in a vertical upright position;

Figure 7 is a top plan view of another embodiment of the present invention;

Figures 8 and 9 are a side view and cross-sectional view, respectively, of the embodiment of Figure 7.

A support structure, shown generally as reference numeral 10 in Figure 1, is provided with a longitudinal base member 12 and a plurality of sets of generally upwardly directed bracing members or supporting struts 14 and 16, 14a and 16a, 14b and 16b, etc. The individual brace members of each set are spaced laterally from each other at their upper extremities. Brace members 14, 14a, 14b etc. are connected at their upper extremities to a beam member 18 which extends longitudinally from one end of the support structure to the other. Another beam member 20 is connected to the upper extremities of bracing members 16, 16a, 16b, etc. Beam member 20 is parallel with beam member 18. Together, the two beam members 18 and 20 define a surface having the contour of the edge of the glass sheet to be supported.

Since the supporting struts 14, 16, 14a, 16a, etc. are arranged in spaced pairs extending upwardly from the base member 12 and the pairs define spaced vertical planes, beam members 18 and 20 are rigidly supported at various points spaced along their length. The various members of the support structure thus far described may be connected together in any suitable manner such as welding, brazing or any other type of connection that will not be disturbed by the temperatures to which the glass sheet is to be subjected.

A wire 22, preferably of Monel metal, other alloys or any material of sufficient ductility and rigidity to support the glass sheet at the tempering temperatures is looped between the rod like longitudinal beam members 18 and 20 and extends from one end to the other end of structure 10. A multiplicity of spaced loops are provided along the length of the support structure. Thus, beam members 18 and 20 provide the loci of a pair of spaced points of support for the bottom edge supporting network 22.

Referring to Figures 2 and 3, a supporting structure 10 is shown supporting a sheet of glass 24 in conjunction with a tempering frame 25 provided with an upper portion 26, and a lower portion 28 interconnected by side portions 30, only one of the latter being shown. A plurality of sliding members 32 are connected to the top portion 26 at spaced intervals and locked in place thereon by means of lock nuts 34. Suspended from each sliding member 32 is a bifurcated hairpin member or toggle 36 of a resilient material such as stainless steel. The space between the bifurcated portions of the toggle 36 is preferably slightly greater than the thickness of the glass sheet to be tempered to facilitate mounting of the sheet. Also, the ends 38 of the toggle 36 are opened at 38 to embrace the top edge of the sheet loosely and to insure point contact between the vertically supported glass and the toggle member, thus preventing the possibility of the toggle member marring the viewing surface of the glass sheet. The toggle members serve to balance in a vertical plane a glass sheet supported at its bottom edge on the spaced support points provided by the looped wire 22 without requiring any structural element of the support structure to touch a side edge or viewing surface of the sheet during thermal treatment. The present invention thus limits the location of regions of optical distortion to points spaced along the bottom edge and adjacent the top edge of the final product. These regions of optical distortion caused by contact of the support apparatus during thermal treatment are quite small and are covered by a glazing frame when the final product is installed.

The tempering frame 25 may be either suspended or mounted on rollers which ride along tracks, thereby facilitating movement of the glass into and out of a tempering furnace. These latter features are not shown since they are conventional and are not considered part of the present invention. The base member 12 is shown bolted to the horizontal portion 28.

In operation, the glass sheet to be tempered is so oriented that the bottom edge, which conforms to the shape of the unit, rests on the supporting wire loops. The loops 22 are not required to be adjusted exactly before the glass sheet to be supported is mounted, since the wires are capable of adjusting themselves somewhat when supporting the weight of the glass. Furthermore, as the glass is heated to the tempering temperature within a tempering furnace, the supporting wires yield under the weight of the supported glass and expand due to the increase in temperature while the originally non-supporting wires expand due to the increase in temperature only so that the number of supporting points for the bottom edge of the glass is increased until the bottom edge is supported at spaced points by each of the loops.

The number and distribution of the support points for the glass is very important as the glass tends to sag near any support point required to support a column of glass weighing more than a certain maximum mass. For example, the support points may be more widely spaced when thin glass sheets are supported vertically than when thicker glass sheets of the same width are supported. Also, wider glass sheets of the same thickness require closer spacing of the support points than narrower glass sheets.

The finally tempered glass sheet has a plurality of very small imperfections along its supported edge. These imperfections are so small that they do not extend into the critical vision area of the glass. The toggle means 36 suspended from the upper frame member 26 prevents toppling of the glass sheet during the tempering operation.

While the description thus far has been limited in its showing to a structure for supporting a flat sheet of glass provided with a straight supported edge, it will be understood that either flat or curved sheets of glass having either straight or curved supported edges may be supported vertically by supporting structures embodying the concepts of the present invention. For example, in Figure 4 a supporting structure is shown for supporting glass sheets having curved supported edges. In this structure, a base member 112 is provided with spaced sets of supporting struts 114 and 116, 114a and 116a, 114b and 116b, etc., which support curved beam members 118 and 120. The latter are shaped to the curvature of the edge of the glass sheet to be supported and are interconnected by a looped webbing 122 of wire similar to webbing 22 disclosed in Figure 1. The structure is adapted to support a sheet of glass 124. In this embodiment, the beam members 118 and 120 are parallel to each other but are spaced various distances from the base member 112 depending upon the curvature of the supported edge of the glass plate 124. If the supported edge curves radically from the horizontal, it may become necessary to cover the supporting wires 122 with a friction coating such as fiber glass to prevent slippage of the wires from their desired locations looping the beam members.

As seen in Figure 5, the supporting struts 114, 114a, 114b, 116, 116a, 116b, etc. may extend vertically upwardly through the base member 112 and are rigidly connected at their upper extremities with the corresponding beam member 118 or 120. The supporting struts may be externally threaded to be vertically adjustable by rotating various adjustment nuts 140. While beam members 118 and 120 have sufficient rigidity to support a glass sheet and the support network 122, they are also sufficiently resilient to change their shape in response to the stresses supplied by the relative vertical motion of the supporting struts, thereby generally conforming within limits to the shape of the bottom edge of the supported glass sheet. It is understood that the structural embodiment of Figure 4 may be provided with or without some adjustment mechanism as desired.

In Figure 6 is disclosed a top plan view of a supporting structure for supporting curved sheets of glass vertically. A base member 212 is provided with spaced sets of strut members 214 and 216, 214a and 216a, etc. which support a pair of curved beam members 218 and 220. While beam members 118 and 120 are shown as being curved vertically in Fig. 4, beam members 218 and 220 are curved horizontally. A web of wire loops 222 is supported between beam members 218 and 220 and extends from one end to the other end of the support structure to provide a bottom support for a vertically disposed glass sheet.

It will be understood that in order to support curved sheets that are provided with a curved supported edge that it is necessary to combine the modifications shown in Figure 4 with those shown in Figure 6 with or without a vertical adjustment means such as shown in detail in Figure 5 or any alternative thereof, as desired.

Referring to Figures 7, 8 and 9, still another embodiment of the present invention is disclosed. In this embodiment, the support structure, generally depicted as reference number 310, is provided with a longitudinal base member 312. A pair of longitudinally extending block members 313 and 315 are secured to the sides of the base member as by welding and extend along the length thereof. A set of longitudinally spaced aligned apertures 317 are drilled through block member 313 and the adjacent portion of base member 312. An equivalent set of longitudinally spaced, aligned apertures 319 are drilled through block member 315 and the adjacent portion of the base member. Apertures 319 are staggered relative to the location of apertures 317 longitudinally of the structure 310.

A pair of laterally spaced sets of vertically extending rods 321 extend through as many of the holes 317 and 319 as required to provide anchors for a crisscrossing wire web 322, similar to the wire 22 shown in the other embodiments, which web is adapted to support the bottom edge of a glass sheet vertically. In order to secure the wires 322 on the rods 321, each rod is provided with a horizontal groove 323 adjacent its top which provides a means for supporting the wire where the latter is looped about each rod.

Each rod is vertically adjustable by sliding relative to its associated block member. Thus, the network of supporting wires can be readily adjusted to the contour of the bottom edge of the glass sheet to be held vertically by the proper adjustment of each vertical rod. Set screws 325 are provided to lock each rod in its proper vertical position. Of course, other suitable adjusting means such as a turnbuckle may be used to locate the rods vertically.

Angle irons 327 are attached to the lower surface of the base member 312. These angle irons, in conjunction with a depending flange 329 and a screw member 331 provide a means for attaching the supporting member to the lower portion 28 of a frame used to transport the supporting structure and supported glass sheet to and from a tempering furnace.

The apparatus depicted in Figures 7, 8 and 9 is more suitable for vertically supporting glass sheets having sharply curved bottom edges than that shown in Figure 4, since a friction covering of glass cloth or glass fiber required to prevent the wires of the Figure 4 embodiment from slipping together to provide an undesirable solid support in the regions where the bottom edge of the glass sheet is tilted substantially from the horizontal is not needed in the presently described apparatus. Also, in instances where the supporting frame is used in the spray application of an electroconductive coating, the embodiment of Figures 7, 8 and 9 is preferable because a more uniform exposure of the bottom edge to a spray is provided when the supporting wires are supported between vertical support rods rather than horizontal beam members.

It is understood that the holes 317 and 319 are not all required to contain the vertically adjustable, wire supporting rods, but that the requirements for spacing the supporting rods depend upon the considerations of weight to be supported by each supporting wire that was mentioned above in connection with the embodiments containing the horizontal beam members.

Various departures may be made from the specific structures depicted in the drawings without departing from the scope of the present invention. For example, the bracket support shown in Figure 1 to be V-shaped in cross section may be made rectangular or hemispherical or of any other suitable shape. These and other modifications which come within the limitation of the appended claims are considered to be incorporated in the present invention.

What is claimed is:

1. In apparatus for supporting a glass sheet in a vertical position comprising a frame having spaced top and bottom horizontal members and spaced vertical side members connecting the horizontal members, a skeleton supporting structure adapted to be connected to the bottom horizontal member and comprising bottom edge support means including a pair of laterally spaced, open beams and a wire looped around and between the beams throughout their length to provide spaced points of support for the bottom edge of the glass sheet, said wire being looped sufficiently loosely between said beams to permit the loops to adjust themselves so that each loop contacts the bottom edge of the vertically supported glass sheet.

2. Apparatus according to claim 1, wherein the skeleton supporting structure comprises a base member attachable to the bottom horizontal member and spaced brace members interconnecting each open beam to the base member at spaced points of attachment.

3. Apparatus according to claim 1 including balancing means extending downwardly from the skeleton supporting structure above said supporting network to loosely embrace the top edge only of the glass sheet, said apparatus being free from any structure contacting the side edges and major viewing surfaces of the vertically supported glass sheet.

4. In apparatus for supporting a glass sheet in a vertical position, said apparatus including a frame provided with spaced top and bottom horizontal members and spaced vertical side members connecting the horizontal members, the improvement comprising a skeleton supporting structure comprising a base member adapted to be attached to the bottom horizontal member of said frame, a plurality of sets of vertically adjustable strut members spaced longitudinally along the length of said base member, a pair of spaced, rigid yet resilient, substantially horizontally disposed beam members supported by said strut members, and a filamentous supporting network of yieldable material extending transversely between the beam members and extending longitudinally from one end of the supporting structure to the other to provide a multiplicity of supporting points for the edge of the glass sheet.

5. The improvement according to claim 4, wherein balancing means extends downwardly from the top horizontal member to embrace the top edge of the glass sheet loosely, thus preventing toppling of the sheet.

6. In apparatus for supporting a glass sheet in a vertical position during thermal treatment, the improvement comprising a skeleton supporting structure including a pair of laterally spaced sets of longitudinally aligned, vertically adjustable support elements, the support elements of one set being staggered longitudinally of the support elements of the other set, and a single, continuous yieldable wire interconnecting the support elements in a zig-zag relation sufficiently loosely for the wire to adjust itself to provide a multiplicity of spaced support points for the bottom edge of the glass sheet.

7. The improvement according to claim 6 including balancing means extending downwardly from the skeleton supporting structure above said supporting network to loosely embrace the top edge only of the glass sheet, said apparatus being free from any structure contacting the side edges and major viewing surfaces of the vertically supported glass sheet.

References Cited in the file of this patent

UNITED STATES PATENTS

| 564,568 | Meyer | July 21, 1896 |
| 2,025,086 | Black | Dec. 24, 1935 |
| 2,223,123 | Owen | Nov. 26, 1940 |
| 2,297,246 | Quentin | Sept. 29, 1942 |
| 2,359,222 | Kiehl et al. | Sept. 26, 1944 |
| 2,375,944 | Quentin | May 15, 1945 |
| 2,379,213 | Black | June 26, 1945 |

FOREIGN PATENTS

| 442,633 | Great Britain | Feb. 12, 1936 |

Dedication 2,805,519.—*Walter A. Adamsky*, New Kensington, Pa. HANDLING GLASS SHEETS FOR THERMAL TREATMENT. Patent dated Sept. 10, 1957. Dedication filed July 25, 1973, by the assignee, *PPG Industries, Inc.*

Hereby dedicates the remainder of its term to the free use and benefit of the People of the United States.

[*Official Gazette December 4, 1973.*]